United States Patent [19]

Yaccino

[11] 3,864,549

[45] Feb. 4, 1975

[54] n-POSITION SCANNER HAVING PLURAL SEQUENTIALLY ENABLED DECODERS

[75] Inventor: Michael Joseph Yaccino, Mechanicsburg, Pa.

[73] Assignee: AMP Incorporated, Harrisburg, Pa.

[22] Filed: Dec. 7, 1973

[21] Appl. No.: 422,955

[52] U.S. Cl.... 235/61.11 R, 340/146.3 MA, 179/90 B

[51] Int. Cl. .............................................. G06r 7/00

[58] Field of Search ........... 340/146.3 F, 146.3 MA; 235/61.11 R, 61.11 A, 61.11 B, 61.11 C, 61.11 D, 61.11 E, 61.11 F, 61.11 G; 179/90 B, 90 BB, 90 BD, 90 CS

[56] References Cited

UNITED STATES PATENTS

| | | | |
|---|---|---|---|
| 3,440,409 | 4/1969 | Kaminsky et al. | 235/61.11 E |
| 3,634,656 | 1/1972 | Krechmer et al. | 235/61.11 D |
| 3,643,068 | 2/1972 | Mohan et al. | 235/61.11 E |
| 3,700,861 | 10/1972 | Heyden et al. | 235/61.11 R |
| 3,718,771 | 2/1973 | Bank | 179/90 B |
| 3,792,235 | 2/1974 | Durante et al. | 235/61.11 E |
| 3,812,296 | 5/1974 | Paraskevakos | 179/90 B |

*Primary Examiner*—Stanley M. Urynowicz, Jr.
*Attorney, Agent, or Firm*—Gerald K. Kita

[57] ABSTRACT

An n-position scanner is disclosed which includes a two stage binary counter. The first stage of the binary counter is coupled to a plurality of 1-of-16 decoders for providing sequential scanning signals to each of the decoders. The second stage of the binary counter is coupled either directly or through logic networks to control inputs of each of the plurality of 1-of-16 decoders for enabling each of the plurality of decoders in a proper sequence. The 1-of-16 decoders may be used in combination to scan a card reader or any equivalent contact matrix or apparatus. The card reader or equivalent apparatus may include circuits for initiating and terminating scanning cycles.

10 Claims, 2 Drawing Figures

N-POSITION SCANNER HAVING PLURAL SEQUENTIALLY ENABLED DECODERS

BACKGROUND OF THE INVENTION

1. Field of the Invention

This invention relates generally to scanning circuits, and more particularly to an n-position scanning circuit employing binary driven 1-of-*n* decoders.

2. Description of the Prior Art

At the present time punched data cards are used in great abundance as a means of encoding information pertaining to everything from accounting records to sophisticated mathematical calculations. In addition, there is now a growing demand for the use of identification cards, and the like, which have encoded information punched into them. Furthermore, numerous types of manually or automatically settable contact matrices are now in use as point-of-sale encoders and as encoders for various other types of transactions.

Since each of the types of devices described above normally requires a scanning circuit for reading out a contact matrix, or equivalent apparatus, through which the punched or manually recorded data is converted to electrical signals, a need presently exists for improved scanning circuits. Naturally, many different types of scanning circuits have been developed in the past. However these known scanning systems have generally been deficient in one or more important aspects. For example, some known scanning systems are incapable of operating at speeds which are compatible with modern data processing apparatuses. Other known scanning circuits, while extremely efficient in their operation, are much too complicated and expensive to be used in conjunction with low cost point-of-sale card readers, or other equivalent types of devices which rely upon low cost and easy maintenance to render them practical. Some previously known scanning circuits have also been extremely complicated to construct and have required the use of numerous components due to the fact that they have failed to incorporate presently existing integrated circuit modules, which greatly simplify the construction and maintenance of such circuits.

Thus a need exists for a highly simplified, inexpensive scanning circuit which can be conveniently produced from commercially available integrated circuit components and which is capable of operating at high data rates, and which is yet suitable for use in low cost data handling systems, and which may be made of variable length for scanning any desired number of scanning positions.

SUMMARY OF THE INVENTION

Accordingly, one object of this invention is to provide a novel scanning circuit.

Another object of this invention is the provision of a unique n-position scanner constructed of integrated circuit components.

Yet another object of this invention is the provision of a novel digital scanning circuit for use with card readers and other devices employing contact matrices, or solid-state matrices.

A still further object of this invention is the provision of a simplified n-position scanning circuit.

Yet another object of this invention is the provision of a simplified and inexpensive n-position constructed of integrated circuit components.

Briefly, these and other objects of the invention are achieved by providing first and second interconnected binary counter stages which are driven by a clock source. Each of the stages of the first binary counter is coupled to decoding inputs of a plurality of 1-of-16 decoders. Two or more stages of the second binary counter are coupled to controlling inputs of each of the 1-of-16 decoders for sequentially enabling the various decoders. The decoder outputs are coupled to a card reader or equivalent device for providing the device with desired scanning signals.

BRIEF DESCRIPTION OF THE DRAWINGS

A more complete appreciation of the invention and many of the attendant features thereof will be readily obtained as the same becomes better understood by reference to the following detailed description when considered in connection with the accompanying drawings, wherein.

DESCRIPTION OF THE PREFERRED EMBODIMENTS

Figure 1:
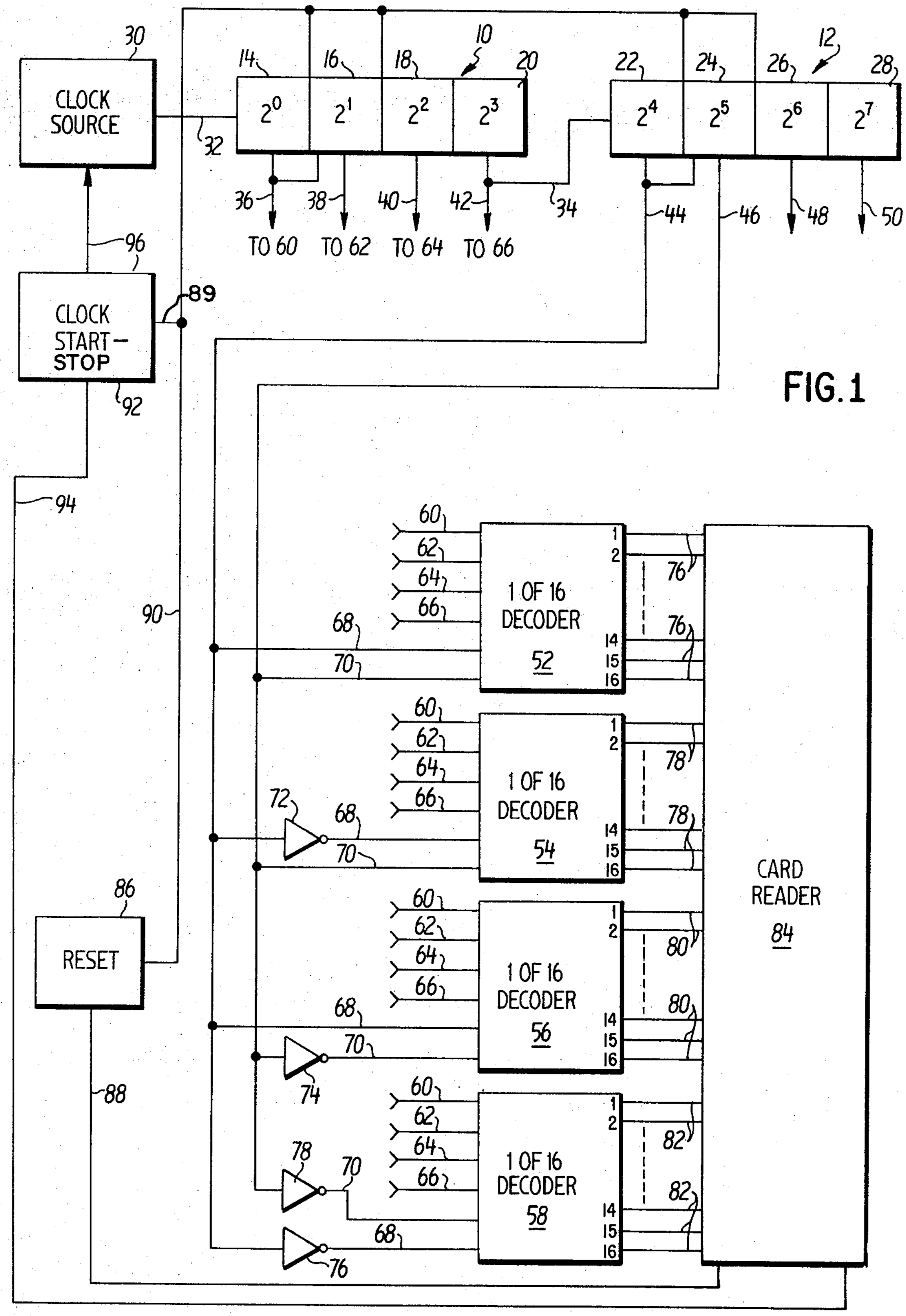
FIG. 1 is a logic block diagram of a first embodiment of the present invention.

Referring now to the drawings, wherein like reference numerals designate identical or corresponding parts throughout the several views, and more particularly to FIG. 1 thereof, a preferred embodiment of the present invention is shown as including first and second binary counters 10 and 12, respectively. The binary counters may be any conventional modern electronic counting circuits, although it is preferred that they be integrated circuits. Numerous binary counter circuits of this type are presently commercially available and thus a detailed description of the counter circuits is omitted for purposes of brevity. The binary counter 10 includes four interconnected binary counting stages 14, 16, 18 and 20 which respectively represent the following powers of 2: $2^0$, $2^1$, $2^2$ and $2^3$. Similarly, the binary counter 12 includes counter stages 22, 24, 26 and 28 which respectively represent the following powers of 2: $2^4$, $2^5$, $2^6$ and $2^7$. Although the entire counting capacity of the binary counter 10 is used according to the present invention, the counting capacity of binary counter 12 may be only partially used, as will be appreciated from the following discussion.

A clock source 30 is coupled via a line 32 to the binary counter 10 for driving the counter. The clock source may be any suitable source of driving pulses for operating the scanner of the present invention. The clock source may thus be a conventional source of sequentially timed pulse outputs, or it may be a particular cicuit with which the scanner of the present invention is to be synchronized. The frequency of the clock source 30 determines the scanning speed of the present invention, as will be understood by those skilled in the art, and thus the clock frequency may be selected so that the scanner operates at a rate which is matched to the application in which the scanner is to be used.

The binary counters 10 and 12 are coupled together by a line 34 which connects the output of the final stage 20 of the counter 10 with the input of the first stage 22 of the counter 12. Thus all of the counter stages 14–28 are coupled together in sequence and all are triggered in order upon receipt of the proper number of pulses from clock source 30 until the counters 10 and 12 are reset. Each of the counter stages 14–28 includes a separate output line 36–50, respectively. The output lines 36, 38, 40 and 42 of counter 10 are coupled to decoding inputs of each of four 1-of-16 decoders, 52, 54, 56 and 58. More particularly, the counter stage output line 36 is coupled to a decoding input 60 of each decoder, the counter stage output line 38 is coupled to a decoding input 62 of each decoder, the counter stage output line 40 is coupled to a decoding input 64 of each decoder and the counter stage output line 42 is coupled to a decoding input 66 of each decoder.

Counter stage output lines 44 and 46 are coupled to enabling inputs 68 and 70 of each of the decoders 52 – 58, respectively. Counter stage output lines 48 and 50 are not utilized in the embodiment of the invention illustrated in FIG. 1. The counter stage output lines 44 and 46 are both coupled directly to the enabling inputs 68 and 70 of decoder 52. However, the counter stage output line 44 is coupled through an inverter 72 to the enabling input 68 of decoder 54 and is also coupled through an inverter 76 to the enabling input 68 of the decoder 58. Similarly, the counter stage output line 46 is coupled directly to the enabling input 54 of decoders 52 and 54, but is coupled through an inverter 74 to the enabling input 70 of decoder 56 and through an inverter 78 to the enabling input 70 of decoder 58.

It should be understood that each of the 1-of-16 decoders 52 – 58 are preferably conventional units of this type manufactured by Texas Instruments, Incorporated of Dallas, Texas as Part No. SN 74154, and described in detail in "The TTL Data Book For Design Engineers" published by Texas Instruments, Incorporated, (1973) on Pages 308 to 311. Decoders of this type decode four binary-coded inputs into 1-of-16 mutually exclusive outputs when both of the enable or strobe inputs 68 and 70 are low. The functional logic block diagram of these decoders along with the function table listing output codes corresponding to each input code are found on Page 309 of the previously referenced publication.

Referring again to FIG. 1, the decoders 52, 54, 56 and 58 each include 16 output lines 76, 78, 80 and 82, respectively, all of which are coupled to a card reader or equivalent device 84. Naturally, any contact matrix or combination of manually settable switches can be substituted for the card reader, since the scanner of the present invention is not limited to use with any particular type of apparatus.

A reset circuit 86 is coupled to the card reader 84 via a line 88 and is also coupled via a line 89 to the start-stop trigger 92 to stop and reset the clock, and is also coupled by a line 90 to the binary counters 10 and 12 for the purpose of resetting the binary counters when the card reader 84 has been fully scanned. In the embodiment of the invention illustrated in FIG. 1 the final stages 26 and 28 of the binary counter 12 are not utilized. Thus the binary counters 10 and 12 are reset after actuation of the stage 24 for reasons which will be apparent presently. Automatic resetting of the counters 10 and 12 by the card reader 84 is an optional feature, and can be eliminated from the apparatus of the present invention. Instead of this type of automatic reset, the clock 30 may be stopped and counters 10 and 12 can be manually reset, if desired, by manual actuation of the reset 86.

Similarly, a clock start circuit 92 is shown coupled via a line 94 to the card reader 84 and through a line 96 to the clock source so that the clock source may be automatically started by a signal received from the card reader. For example, the card reader may be constructed to include a circuit for sensing the insertion of a card which in turn triggers the clock start circuit 92 for beginning operation of the clock source 30. However, the automatic clock starting feature of the present invention may be eliminated and a manual circuit for starting the clock source 30 may be substituted therefore.

The operation of the embodiment of the invention illustrated in FIG. 1 will now be described in more detail. Initially the binary counters 10 and 12 are in their reset condition due to the operation of the reset circuit 86. Upon insertion of a card into the card reader 84, the clock start circuit 92 is actuated initiating operation of the clock source 30. As pointed out previously, the clock start 92 need not be exclusively associated with the insertion of a card into the card reader 84, but may be a manually operated circuit, if desired. Starting of the clock source 30 causes a sequence of pulses to be fed over the line 32 to binary counter 10, permuting the counter. A signal representing the state of each counter stage 14 – 20 of the counter 10 is applied over counter output lines 36 – 42 to the decoding inputs 60 – 66 of each 1-of-16 decoder 52, 54, 56 and 58. However, as described in the above referenced Texas Instrument Incorporated publication, the decoders are enabled only if a low (logical 0) input is applied to both enabling inputs 68 and 70. Since the binary counter 12 is initially reset, low signals are initially present on the counter stage output lines 44 and 46. Thus low signals are applied to the enabling inputs 68 and 70 of decoder 52, but not to the enabling inputs of any of the other decoders in view of the presence of inverters 72, 74, 76 and 78 coupled to the other decoders. Thus only the decoder 52 is initially enabled. Accordingly, permutation of the binary counter 10 causes a scanning output (a logical 0 or a low voltage) to sequentially appear on the 16 output lines 76 of the decoder 52.

The 17th clock pulse fed to the interconnected binary counters 10 and 12 causes the counter stages 14 – 20 of counter 10 to reset to 0 while the counter stage 22 of binary counter 12 is triggered so that a high signal (logical 1) appears on counter stage output line 44. Accordingly decoders 52 and 56 are disabled by the high signal appearing on counter stage output line 44 while the decoder 58 is disabled because of the inverted low signal appearing on counter stage output line 46. However the inverter 72 inverts the high signal on counter stage output line 44, causing the decoder 54 to be enabled. Accordingly subsequent clock pulses result in the appearance of a scanning signal on the 16 output lines 78 of decoder 54. Similarly further clock pulses cause additional permutations of the counter stages 22 and 24 of binary counter 12 for enabling the decoders 56 and 58 in sequence until all 64 output lines of the decoders have been scanned. A signal from the card reader 84, or from the last stage scanned if desired, activates the reset circuit 86 resetting the counters 10 and 12 while the clock source 30 is simultaneously stopped by an appropriate manual command or by a signal from the card reader 84, if desired.

Figure 2:
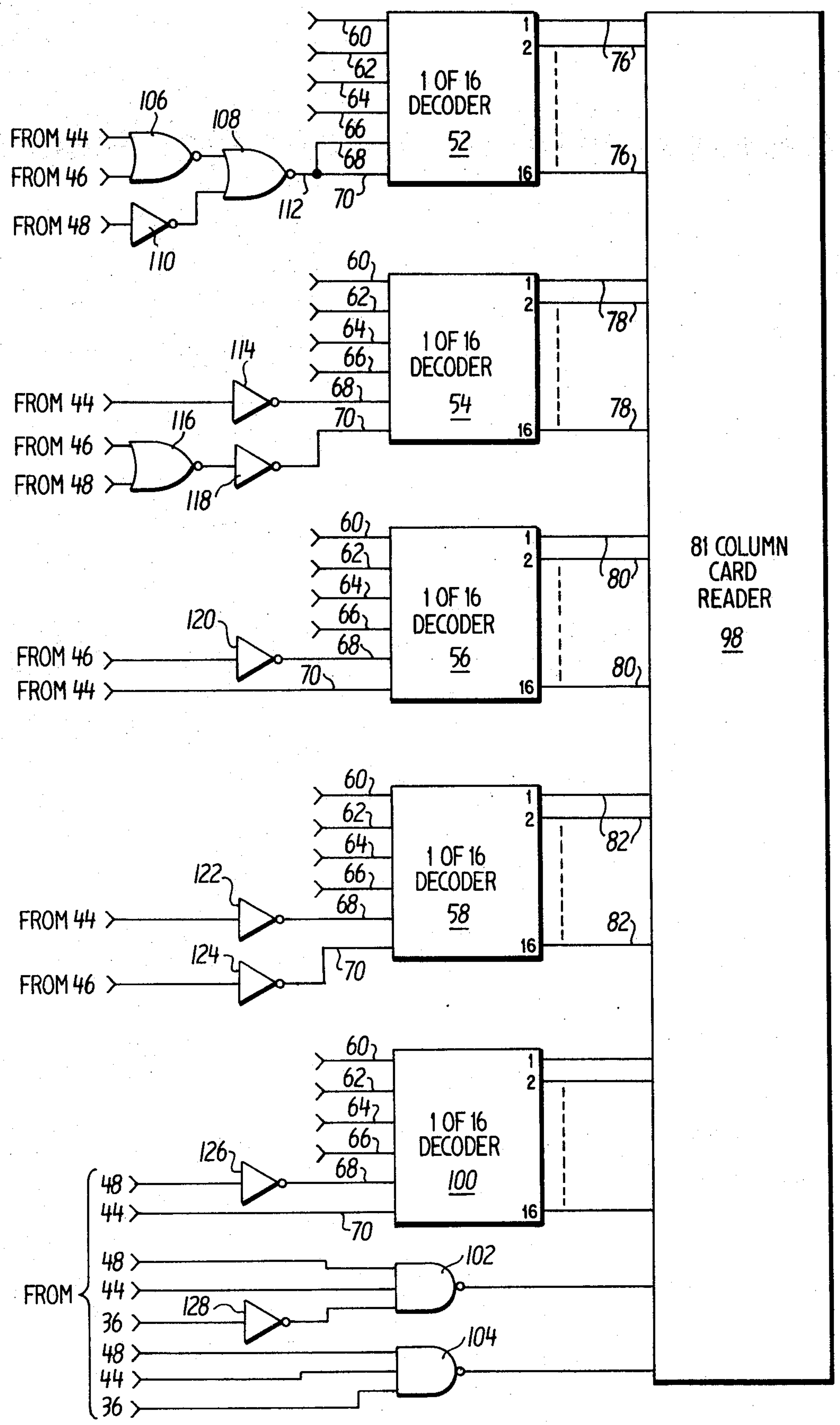
FIG. 2 is a logic block diagram of a second embodiment of the present invention.

Attention is now directed to FIG. 2 wherein a second embodiment of the present invention is illustrated schematically in block diagram form. The embodiment of the invention illustrated in FIG. 2 differs from that illustrated in FIG. 1 in that it is designed to scan 81 columns of data, whereas the device illustrated in FIG. 1 was capable of scanning only 64 data columns. Thus the apparatus of FIG. 2 includes an additional decoder as well as unique logic for enabling the various decoders.

Referring specifically to the system shown in FIG. 2, it will be observed that the card reader 84 of FIG. 1 has been replaced by an 81 column card reader 98. The 81 column card reader actually includes 82 data positions, the first one of which is a "home" or reference position. A card reader of this type may, for example, be the model 2980 card reader produced by the AMP Corporation of Harrisburg, Pennsylvania. Naturally, any other type of card reader or contact matrix device having 82 data positions can be used with the scanner of the present invention. The first four decoders 52 – 58 illustrated in FIG. 2 are identical to those of FIG. 1. However, a fifth decoder 100 has been added in the circuit of FIG. 2. This decoder is identical in structure to the remaining decoders described in more detail above. The circuit of FIG. 2 also includes 2 NAND gates 102 and 104 for providing two extra columns of scanning capacity in addition to those provided by the five decoders.

The binary counters 10 and 12, the clock source circuit 30, the clock start circuit 92 and the reset circuit 86 of FIG. 1 are not shown in FIG. 2, although it will be understood that identical circuits may be used in the embodiments of FIGS. 1 and 2. However a unique logic network is provided in the embodiment of FIG. 2 for coupling the binary counters 10 and 12 to the various decoders and NAND gates. More particularly, each of the 1-of-16 decoders includes two enabling inputs 68 and 70, as in the embodiment of FIG. 1. However in the FIG. 2 embodiment a more complex logic network is required for enabling the five decoders.

In particular, the enabling logic of decoder 52 in the FIG. 2 embodiment includes a two input NOR gate 106, the two inputs of which are coupled to counter stage output lines 44 and 46, and the output of which is coupled to one input of a second NOR gate 108. An inverter 110 is coupled to counter stage output line 48 at its input, and at its output to the remaining input of NOR gate 108. The output of NOR gate 108 is coupled to a line 112 which is connected to both enabling inputs 68 and 70 of the decoder.

Similarly, an inverter 14 is coupled at its input to counter stage output line 44 and at its output to enabling input 68 of decoder 54. The enabling input 70 of decoder 54 is controlled by counter stage output lines 46 and 48 which are both coupled to the inputs of a NOR gate 116. The output of NOR gate 116 is coupled to the input of an inverter 118 which is in turn coupled at its output to the enabling input 70 of the decoder 54.

The control logic of decoders 56, 58 and 100 is relatively simple, with decoder 56 simply having its enabling input 68 coupled to counter stage output line 46 through an inverter 120 and its enabling input 70 coupled directly to counter stage output line 44. Similarly, the enabling input 68 of decoder 58 is coupled to counter stage output line 44 through an inverter 122 and the enabling input 70 of the same decoder is coupled to counter stage output line 46 through an inverter 124. The enabling input 68 of decoder 100 is coupled to counter stage output line 48 through an inverter 126 while the enabling input 70 of the same decoder is coupled directly to counter stage output line 44.

Two inputs of three input NAND gate 102 are coupled directly to counter stage output lines 44 and 48 while the third input is coupled through an inverter 128 to counter stage output line 36. The three inputs of NAND gate 104 are coupled directly to counter stage output lines 36, 44 and 48.

The operation of the embodiment of the invention illustrated in FIG. 2 is very similar to that of FIG. 1 except for the scanning of additional columns. The input logic networks controlling each of the decoders causes each of the various decoders to be enabled in sequence. The counter stage output lines 36 – 42 of binary counter 10 are, of course, coupled to the decoding inputs 60 – 66 of each of the decoders. Thus each of the decoders are scanned in sequence. After all five decoders are scanned, the two NAND gates 102 and 104 are scanned completing the scanning of card reader 98.

It will be appreciated that additional decoding stages can be added to the system illustrated in FIG. 2 by the coupling of appropriate logic networks between the output stages of binary counter 12 and the newly added decoders. The addition of more decoders would, of course, increase the data columns scanning capacity of the scanner of the present invention. The FIG. 2 embodiment showing an 82 column scanner is a practical apparatus in view of the fact that most conventional data cards contain 80 data columns.

In the embodiment of FIG. 2 the NAND gates 102 and 104 have been added in place of an additional decoder for purposes of economy. Thus, although it would be possible to add a sixth decoder to the circuit of FIG. 2, provided an appropriate enabling logic network were devised, the use of an additional 1-of-16 decoder to provide the capability of scanning only 2 more data columns would be uneconomical. Accordingly, the special scanning logic networks comprised of NAND gates 102 and 104 simplify and reduce the cost of the overall system.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiple position scanning circuit comprising:

first and second interconnected binary counters, each binary counter having a plurality of stages;

counter stage output means coupled to each of said plurality of stages for providing output signals representative of the state of each said stage, a source of clock signals coupled to said binary counters for permitting said counters, a plurality of 1-of-*n* decoders coupled to said binary counters, each having a plurality of decoding inputs, a plurality of enabling inputs and a plurality of scanning outputs, first circuit means coupled between said counter stage output means of said first binary counter and said decoding inputs of each of said decoders for applying said signals representative of the state of each counter stage to said decoders; and, second circuit means coupled between at least one of said counter stage output means of said second binary counter and said enabling inputs of each of said decoders for sequentially enabling said plurality of decoders, whereby said scanning outputs of said plurality of decoders are sequentially scanned as said clock signals are applied to said binary counters.

2. A multiple position scanning circuit as in claim 1, further comprising:

reset circuit means coupled to said first and second binary counters for resetting said counters upon completion of a scanning cycle.

3. A multiple position scanning circuit as in claim 1, further comprising:

a utilization device coupled to said scanning outputs of said decoders to be scanned thereby; and, clock start circuit means coupled between said utilization device and said source of clock signals for starting said source of clock signals in response to a signal from said utilization device.

4. A multiple position scanning circuit as in claim 1, wherein:

four 1-of-*n* decoders are provided; and, wherein both said enabling inputs of one said decoder are coupled directly to counter stage output means of said second binary counter, both said enabling inputs of a second one of said decoders are coupled through inverters to said counter stage output means of said second binary counter, and one of said enabling inputs of each of the remaining decoders is coupled through an inverter to said counter stage output means of said second binary counter.

5. A network for scanning a predetermined number of data positions in a utilization device comprising:

first means for supplying a sequence of pulses in a binary code, second means for supplying a sequence of pulses in a binary code, a plurality of 1-of-*n* decoders, each having a plurality of decoding inputs coupled to said first means, a plurality of scanning outputs for coupling to said utilization device, and a pair of enabling inputs for coupling to said second means;

a separate logic circuit means for coupling said pairs of enabling inputs of each of said decoders with said second means for sequentially enabling said plurality of decoders; and, a plurality of auxiliary logic circuit means coupled to said first and second means for providing an auxiliary scanning capacity.

6. A network for scanning a predetermined number of data positions in a utilization device as in claim 5, wherein:

said second means comprises a multiple stage binary counter.

7. A multiple position scanning circuit as in claim 6, wherein:

one of said separate logic circuit means includes a two input NOR gate coupled at its output to both inputs of one of said decoders, and having a second NOR gate and an inverter coupled to its input, and wherein stages of said binary counter are coupled to the inputs of said second NOR gate and said inverter.

8. A multiple position scanning circuit as in claim 6, wherein:

one of said separate logic circuit means includes an inverter coupled to one of said enable inputs of one of said decoders, said inverter having a NOR gate coupled to its input, and wherein said NOR gate includes a plurality of inputs which are coupled to stages of said multiple stage binary counter.

9. A multiple position scanning circuit as in claim 5, wherein:

said plurality of auxiliary logic circuit means include a pair of separate multiple input logic gates having said inputs thereof coupled to said first and second means, and having outputs adapted to be coupled to said utilization device.

10. A multiple position scanning circuit as in claim 5, wherein:

said first and second means comprise multiple stage binary counters coupled together so that said second means is actuated only after said first means has reached its counting capacity.

* * * * *